United States Patent [19]

Jensen et al.

[11] Patent Number: 4,981,420

[45] Date of Patent: Jan. 1, 1991

[54] IMMERSION PUMP

[75] Inventors: Niels D. Jensen; Poul E. Mikkelstrup, both of Bjerringbro, Denmark

[73] Assignee: Grundfos International a/s, Bierringbro, Denmark

[21] Appl. No.: 360,270

[22] Filed: Jun. 2, 1989

[30] Foreign Application Priority Data

Jun. 11, 1988 [DE] Fed. Rep. of Germany ....... 3820005

[51] Int. Cl.$^5$ .............................................. F04D 13/08
[52] U.S. Cl. .................................. 417/423.3; 417/366; 417/423.7; 417/423.8
[58] Field of Search ..................... 417/366, 368, 423.3, 417/423.5, 423.7, 423.8, 424.2

[56] References Cited

U.S. PATENT DOCUMENTS 3,685,926 8/1972 Blum ................................. 417/423.3
4,834,624 5/1989 Jensen et al. ................. 417/423.8 X

FOREIGN PATENT DOCUMENTS 3642727 6/1988 Fed. Rep. of Germany ...... 417/366

Primary Examiner—Gerald A. Michalsky
Attorney, Agent, or Firm—Dvorak and Traub

[57] ABSTRACT

An immersion pump assembly comprises a wet-rotor motor of which the rotational speed and/or the torque can be varied by means of a frequency changer, and a pump unit. The frequency changer, the wet-rotor motor and the pump unit are arranged one above another within a tubular jacket. The motor comprises a split tube formed as a closed pot which is connected to the jacket and which separates the stator compartment from the pump unit in liquid-tight and pressure-tight fashion. The frequency changer is so installed in the stator compartment that its operating electronic system is disposed on the bottom of the split tube pot in the stator compartment.

7 Claims, 1 Drawing Sheet

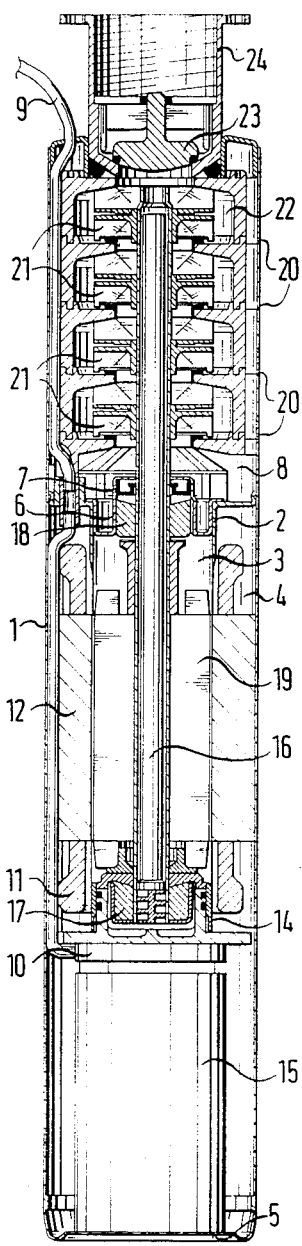

IMMERSION PUMP

FIELD OF THE INVENTION

The invention relates to an immersion pump assembly comprising a wet-rotor motor, a frequency changer for controlling the speed of rotation and/or the torque of the motor, and a pump unit.

Immersion pump assemblies are machine assemblies which are intended to be temporarily or permanently located within a liquid to be conveyed. Such pump assemblies which are for installation in bored wells and in water to be conveyed, are also referred to as underwater motor pumps, and it is to these to which the invention is especially applicable.

BACKGROUND OF THE INVENTION

Since the cost of a well increases with the bore diameter, it is desirable for pump assemblies to be of small external diameter and high rotational speed in order to secure the same pump performance as with a pump of lower rotational speed but of larger external diameter. For such rotational speed the pump assembly must be energised by way of an appropriate system for example by way of a frequency changer.

There is a present trend towards combining all the structural units of a pump assembly within a single structure.

According to EP-A-No.0100 390 three pump elements consisting of the motor, the frequency changer and a pumping stage are combined within a single casing, the pump being of the single stage kind, the rotor of which is selected as a function of the required speed of rotation of the pump. The frequency changer is disposed beside the motor laterally thereof. Such a pump assembly is, however, of relatively complex construction and is, therefore, costly to produce and is unsuitable for use as an underwater motor pump of high performance, for small diameter wells.

SUMMARY OF THE INVENTION

It is an object of the invention to provide an immersion pump assembly which is economical to produce commercially and which can readily be installed in a small diameter bore. To this end, the frequency changer, the wet-rotor motor, and the pump unit are arranged one above another within a tubular jacket, the motor comprising a split tube constructed as a closed pot which is joined to the jacket whilst separating the stator compartment of the motor from the pump body, in fluid-tight and pressure-resistant fashion. The frequency changer is so installed in the stator compartment that the operating electronic system thereof is arranged on the bottom of the split tube pot in the stator compartment.

Thanks to the series or superposed arrangement of the three structural elements, namely the motor, the pump body and frequency changer, one above another within the tubular jacket, the whole assembly is in the form of a cylinder of constant minimum diameter and which is easily insertible into the borehole.

Said closed pot may have an inset bottom of good thermal conductivity which is connected at its open side to said jacket, so that the stator compartment of the motor is separated from the pump body in fluid-tight and pressure-resistant fashion, thereby allowing the frequency changer to be installed in the dry stator compartment. The production of the immersion pump assembly is accordingly greatly simplified.

Since the problem of dissipating waste heat increases as the dimensions of the pump assembly are reduced, the split tube pot is preferably produced from parts made of different materials; thus the pot is made of chromium nickel steel where this is needed for reasons of electrical technology, the bottom or base of the pot, to which the frequency changer is fastened consisting of a material of high thermal conductivity, for example copper. The two components, that is to say the base and the remainder of the pot, are then joined together in fluid-tight fashion, to form a structural unit.

Since the motor is a wet-rotor motor, its rotor compartment is filled with liquid. As the waste heat-generating and temperature-sensitive operating electronic system of the frequency changer is positioned on the base or bottom of said pot within the stator compartment, resistance losses can be transmitted to the liquid within the rotor compartment of the motor with minimal thermal resistance, thereby resolving a significant problem that arises when the components of a pump assembly are combined to form a single unit.

Thermally conductive means, for example a thermally conductive solder paste, solder or an adhesive may be applied between said electronic system and the bottom or base of said pot, in order to reduce the thermal resistance between said electronic system and the liquid within the wet rotor compartment. Such thermally conductive means also act mechanically to connect said electronic system and said pot base or bottom.

In order to simplify the installation of the pump assembly an electrical power supply cable may be inserted into the jacket at one end, to extend therewithin and led in fluid-tight and pressure-resistant fashion with respect to said pot, into the stator compartment at the other end of the jacket.

Damage to the cable during insertion of the pumping set into the bore hole is thereby avoided.

The pump assembly may be provided with a self-adjusting spindle bearing in order to allow a greater tolerance and to simplify the production of the pump assembly.

BRIEF DESCRIPTION OF THE DRAWING

FIG. 1 is an axial sectional view of an immersion pump assembly.

DETAILED DESCRIPTION OF THE INVENTION

The submerged pumping set has a cylindrical, tubular jacket 1, which receives in superposition, three structural units, namely a frequency changer 10, a wet-rotor motor having a rotor compartment 3 and a stator compartment 4, and a pump unit comprising an impeller 21 and a stepped pump chamber 22.

In the lower part of the pump assembly is a split tube pot 2 welded to the jacket 1, and which separates the wet-rotor compartment 3 of the wet-rotor motor from its stator compartment 4 and also separates the stator compartment 4 from the pump body in fluid-tight and pressure-resistant fashion. The pot 2 is preferably connected to the interior of the jacket 1 by welding.

The stator compartment 4, which contains the stator 12 of the motor, is closed from the environment by a base 5, the rotor compartment 3 which contains the rotor 19 of the motor being separated from the pump intake chamber 8 by a bearing carrier 6 and a joint 7.

Electrical power is supplied by a cable 9 extending within the jacket 1 from the upper end thereof to a frequency changer 10 which is in the stator compartment 4 which is sealed by the pot 2 from the pump body and is consequently dry, the windings 11 of the stator 12 being supplied by way of the compartment 4.

In the embodiment illustrated, the cable 9 is led through the jacket 1, so as to be effectively protected thereby against damage.

The pot 2 has a base 14 made of a material of good thermal conductivity, so that waste heat generated by the electronic output system of the frequency changer 10 is dissipated by the liquid in the rotor compartment 3. That portion of the pot 2 which is traversed by the energising magnetic flux of the motor is formed from another appropriate material, for example chromium-nickel steel.

In order to reduce the thermal resistance of the interface between the operating electronic system of the frequency changer 10 and the base 14 of the pot 2, the contact surface at said interface may be provided with thermally conductive means, for example, a thermally conductive paste, a solder or a thermally conductive adhesive. Such a solder or aldhesive also serves to produce a mechanical joint between said surfaces.

A spindle 16 common to the assembly and carrying the rotor 19 is located in bearings 17 and 18 and is axially supported in a self-adjusting thrust bearing.

The pump unit is shown as being a four-stage pump, which draws in water via intake openings 20 in the jacket 1, in the area of the pump body. The water is forced by the impeller 21 into the stepped chamber 22 and is conducted to the return vanes of the next pump stage and so on, and leaves the pump assembly under pressure by way of a check valve 23 and a delivery connector 24.

We claim:

1. An immersion pump assembly comprising a wet-rotor motor having a dry stator compartment, a frequency changer having an operating electronic system for controlling the motor, and a pump unit which houses said frequency changer and said motor which are arranged in superposition within a tubular jacket, and said motor comprising a split tube in the form of a closed pot which is connected to said jacket and which separates said stator compartment from the pump unit in liquid-tight and pressure-resistant fashion, said frequency changer being disposed in said stator compartment with said electronic system thereof being disposed on the bottom of said pot.

2. A pump assembly as claimed in claim 1, wherein said pot comprises a chromium-nickel steel section and a copper bottom which are connected to one another in fluid-tight fashion.

3. A pump assembly as claimed in claim 1, comprising thermally conductive means for reducing the thermal resistance of the interface between said electronic system and the bottom of said pot.

4. A pump assembly as claimed in claim 3, wherein said thermally conductive means consists of a solder.

5. A pump assembly as claimed in claim 3, wherein said thermally conductive means is an adhesive.

6. A pump assembly as claimed in claim 1, comprising an electrical power cable extending outwardly from one end of said jacket, and inwardly into the dry stator compartment in fluid-tight and pressure-resistant fashion with respect to said pot.

7. A pump assembly as claimed in claim 1, comprising a self-adjusting spindle bearing.

* * * * *